April 12, 1949.  W. B. FAIRFIELD  2,467,081
ARTICLE SUPPORTING FIXTURE
Filed March 12, 1946  3 Sheets-Sheet 1

INVENTOR
W. B. FAIRFIELD
BY D. F. Kane
ATTORNEY

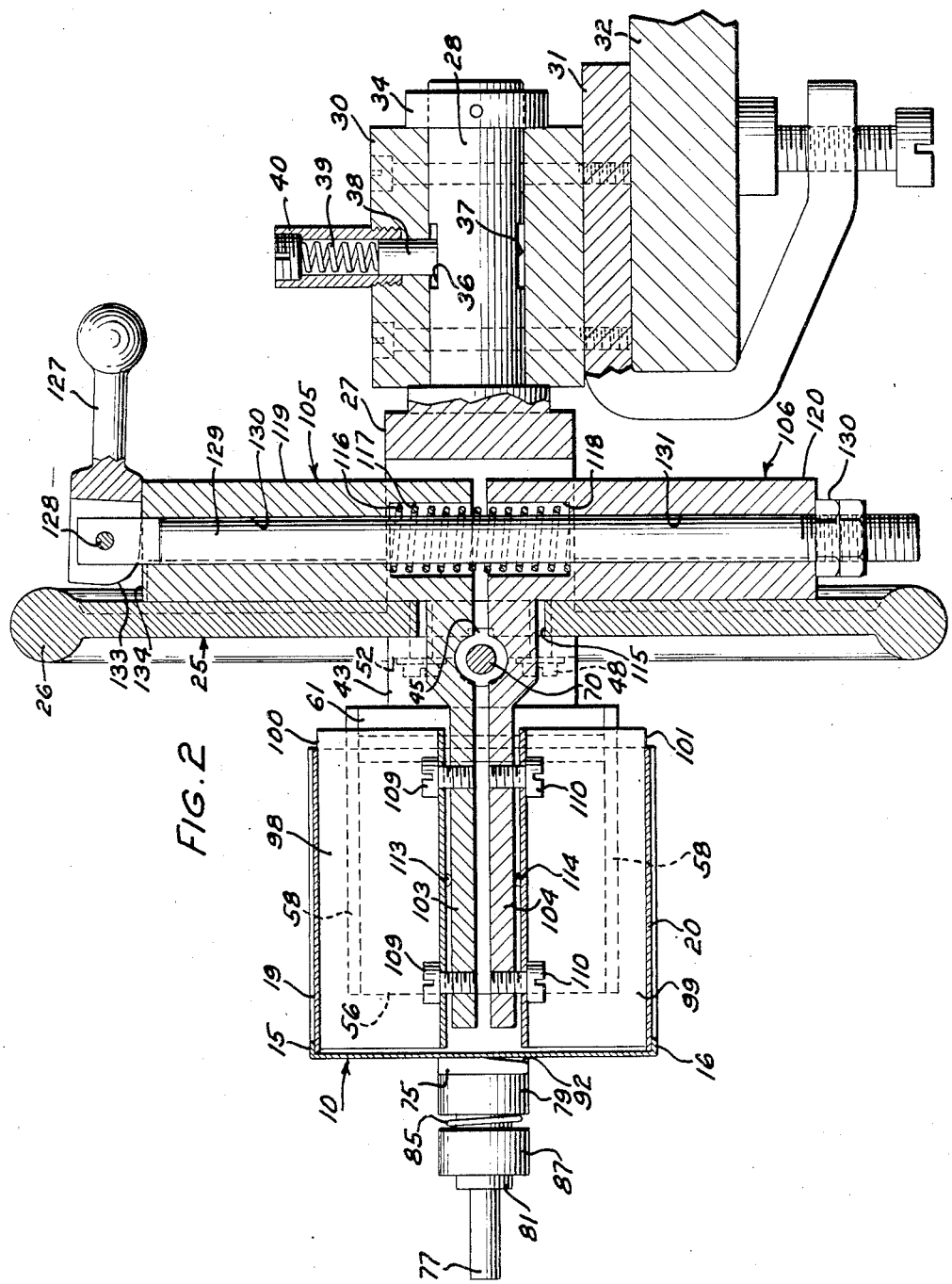

April 12, 1949. W. B. FAIRFIELD 2,467,081
ARTICLE SUPPORTING FIXTURE
Filed March 12, 1946 3 Sheets-Sheet 3
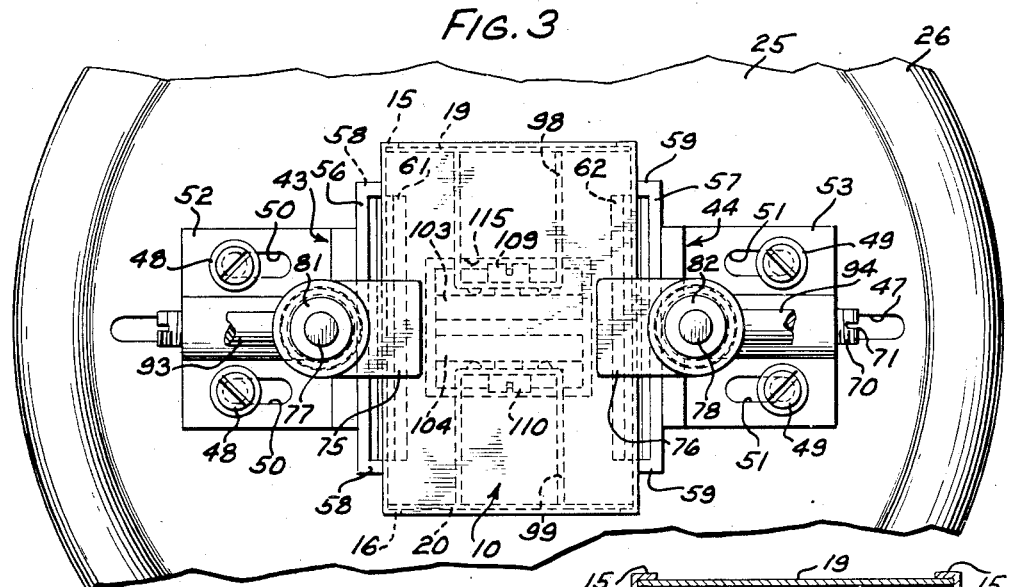
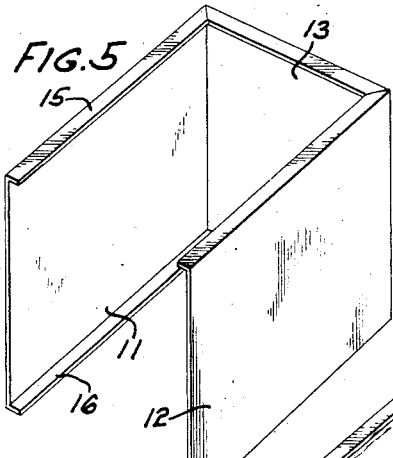
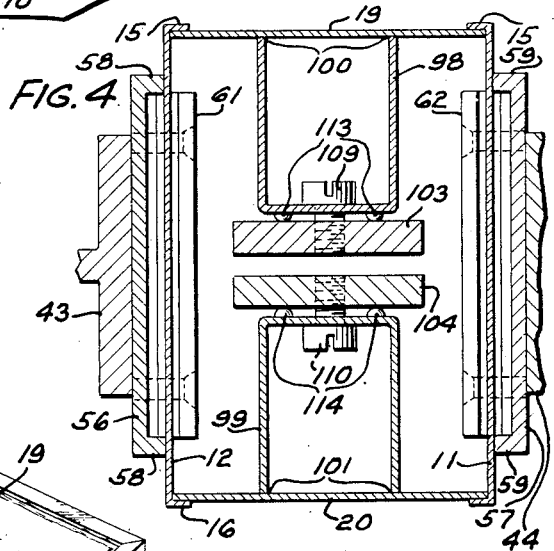
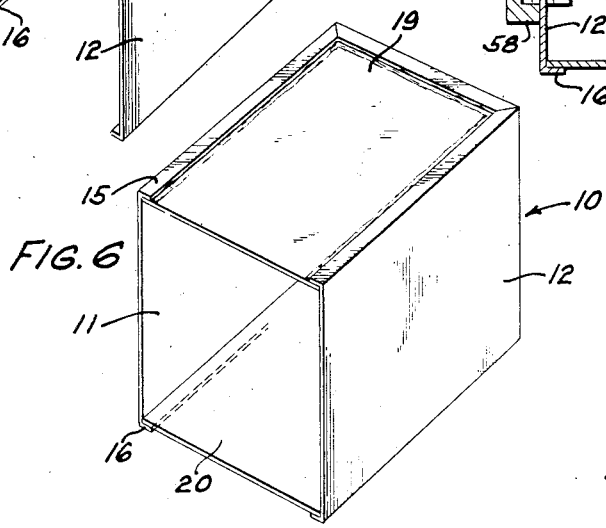
INVENTOR
W. B. FAIRFIELD
BY B. A. Kane
ATTORNEY Patented Apr. 12, 1949

2,467,081

UNITED STATES PATENT OFFICE 2,467,081

ARTICLE SUPPORTING FIXTURE

Walter B. Fairfield, La Grange, Ill., assignor to Western Electric Company, Incorporated, New York, N. Y., a corporation of New York Application March 12, 1946, Serial No. 653,882

11 Claims. (Cl. 113—100)

This invention relates to article supporting fixtures and more particularly to soldering fixtures for supporting three-piece cans in assembled relation while the pieces thereof are being bonded together.

An object of the present invention is to provide an efficient and effective article supporting fixture for holding a plurality of parts in assembled relation while they are being processed.

In one embodiment of the invention, there is provided a supporting member mounted for rotation and having a pair of aligning members for receiving a flanged U-shaped can member in predetermined position thereon and a pair of movable elements mounted on the support and yieldingly urged apart simultaneously to engage and press can side plates against the opposite flanges of the U-shaped can member and hold the parts of the can in assembled relation with one side thereof in a position accessible to the operator for processing, after the processing of which, the support may be rotated to present the other side of the can in position accessible to the operator for processing.

The invention will be more fully understood from the following detailed description when considered in connection with the accompanying drawings illustrating a preferred embodiment of the invention in which Fig. 1 is a plan view of the fixture with parts broken away and parts shown in section and showing the can parts supported in assembled relation therein;

Fig. 2 is a vertical longitudinal sectional view taken on the line 2—2 of Fig. 1 in the direction of the arrows;

Fig. 3 is a front elevational view of a portion of the fixture showing the can parts in position therein;

Fig. 4 is a vertical sectional view taken on the line 4—4 of Fig. 1 in the direction of the arrows showing the can parts supported in assembled relation therein;

Fig. 5 is a perspective view of a flanged U-shaped can member; and

Fig. 6 is a perspective view of the finished can showing the flanged U-shaped member united in assembled relation with the side plate members.

Figure 1:
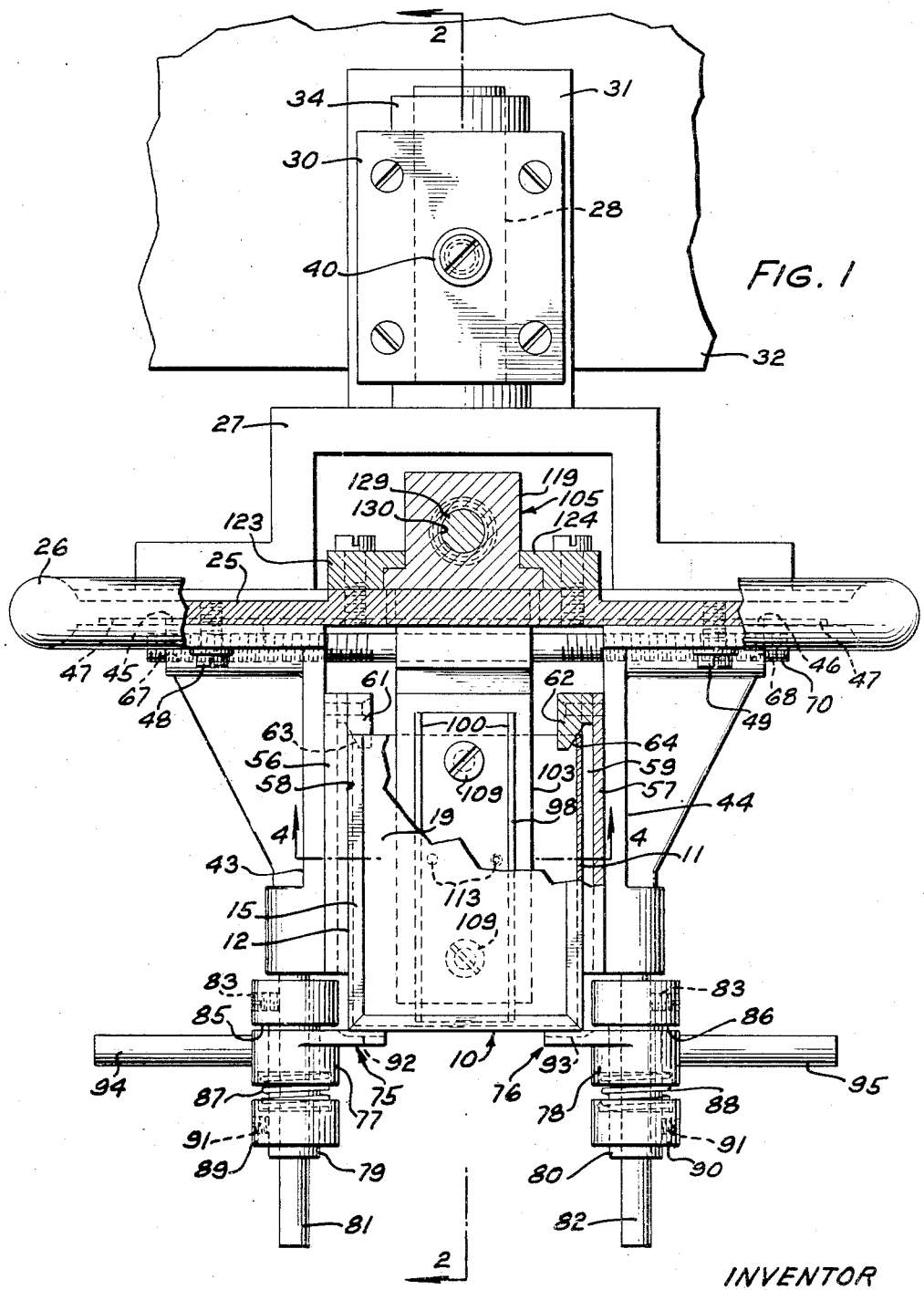

The fixture is used for supporting a plurality of can parts in assembled relation while the parts are processed to unite them into a unitary structure. The composite can (Fig. 6) comprises a U-shaped body member 10 having two parallel walls 11 and 12 connected by the wall 13 (hidden in Fig. 6 but shown in Fig. 5), the opposite side edges of the walls being laterally bent to form flanges 15 and 16, and a pair of side plates or wall members 19 and 20 fitting within the U-shaped member 10 and engaging and soldered to the flanges 15 and 16 thereof.

The fixture for supporting the can parts in assembled relation, as illustrated particularly in Figs. 1 and 2, comprises a supporting member 25 in the form of a disc having a circular handle portion 26 and having secured to the back face thereof a yoke-shaped bracket 27 provided with a trunnion or stub shaft 28. The trunnion 28 is journalled in a bearing 30 secured to a clamping bracket 31, by means of which the fixture may be mounted on a suitable table or support 32 (Fig. 2). The trunnion 28 is retained in the bearing 30 by a collar 34 pinned thereto and is provided with a pair of diametrically opposed flat surfaces 36 and 37, which are engaged by a plunger 38 yieldingly urged thereagainst by a spring 39 enclosed within a tubular housing 40 on the bearing member 30. By this arrangement, it will be seen that the support 25 is rotatably mounted and may be rotated to and retained in either of two positions 180° apart.

A pair of adjustable aligning brackets 43 and 44 are mounted on the front face of the supporting disc 25 to receive and position the U-shaped can member 10. The brackets 43 and 44 are provided with keys 45, 46, which fit in a horizontal keyway 47 formed in the support 25 and the brackets are adjustably secured to the support by cap screws 48—48 and 49—49 passing through slots 50—50 and 51—51 in end walls 52 and 53, respectively, of the brackets 43 and 44 and threadedly engaging the supporting member 25. To the parallel inner faces of the brackets 43 and 44 are secured replaceable positioning plates 56 and 57 having inwardly directed flanges 58—58 and 59—59 (Fig. 4), which are adapted to engage the wall portions 11 and 12 of the can member 10 along the marginal portions thereof when a can member 10 is positioned therebetween. Fastened to the plates 56 and 57 at one end thereof are blocks 61 and 62 provided with inclined faces 63 and 64, respectively, adapted to engage the end edges of the wall portions 11 and 12 of the can member 10 and cam them outwardly against the positioning flanges 58 and 59, respectively, to prevent the can sides from warping upon the application of heat thereto during processing and to serve as stops to limit movement of the U-shaped cam member 10 toward the supporting member 25.

The brackets 43 and 44 are adjustably mounted on the supporting member 25 and, to facilitate their adjustment, they are provided with threaded apertures 67 and 68, which are engaged by the threaded ends of an adjusting rod 70 (Fig. 1). The direction of the threads on one end of the rod is opposite to that on the other end so that, as the rod 30 is rotated, the brackets are moved in opposite directions. The rod 70 is slotted at 71 to receive a tool for turning the rod. To adjust the relative spacing of the brackets 43 and 44, the retaining screws 48 and 49 are loosened and the rod 70 is rotated to move the brackets to the desired position, after which the screws 48 and 49 are again tightened to secure the brackets to the supporting member 25.

The brackets 43 and 44 may be accurately adjusted relative to each other so as to frictionally engage and hold a U-shaped can member 10 therebetween or, if desired, positive means may be provided to hold the can member 10 in position, as, for example, a pair of clamps or holding members 75 and 76 (Figs. 1 and 3). The members 75 and 76 are formed integral with and extend from apertured bosses 77 and 78 rotatably mounted on sleeve members 79 and 80, which are carried by rods 81 and 82 extending from the front end of the brackets 43 and 44. The sleeves 79 and 80 are adjustably secured to the rods 81, 82 by set screws 83—83 in the enlarged ends thereof which form shoulders 85 and 86, against which the members 75 and 76 are urged by helical springs 87 and 88. The springs 87 and 88 seat against collars 89 and 90, which are secured to the sleeves by set screws 91—91. The can engaging portion of the members 75 and 76 are formed with sloping cam surfaces 92 and 93 and are adapted to be turned by means of handles 94 and 95 thereon from a vertical position to a horizontal position, as indicated in Fig. 3, where they engage the end of the can member 10 and are cammed rearwardly by the can member and urge the can member 10 forwardly under a yielding pressure to hold the can member in position.

To support the can side plates 19 and 20 in position against the flanges 15 and 16, channel-shaped supporting brackets 98 and 99 (Fig. 4), having spaced supporting edges 100—100 and 101—101, respectively, are provided and are secured to horizontally extending portions 103 and 104 of L-shaped supporting members 105 and 106 mounted on the main supporting member 25 (Fig. 2). One or both of the members 105 and 106 may be movable and, as illustrated herein, both of the members 105 and 106 are slidably mounted on the member 25. The members 98 and 99, positioned between the brackets 43 and 44, are secured to the horizontal projecting portions 103 and 104 by a pair of shouldered adjusting screws 109 and 110 and are provided with a pair of spaced embossments 113 and 114 located midway between the ends thereof and between the adjusting screws 109—109 and 110—110. The embossments 113 and 114 engage the supports 103 and 104 and provide pivot points about which the members 98 and 99 may be tilted to align their edges 100 and 101 relative to each other so as to properly position the can side plates 19 and 20 relative to the flanges of the can member 10.

The horizontal portions 103 and 104 of the L-shaped members 105 and 106 extend through a central aperture 115 (Fig. 2) in the supporting member 25 and are normally urged apart by an expansion spring 116 mounted in recesses 117, 118 formed in the vertically extending portions 119, 120 of the L-shaped supporting members. The vertical portions 119 and 120 are T-shaped in cross section and are mounted for reciprocatory movement in guideways 123 and 124 (Fig. 1) secured to the rear face of the supporting member 25.

A cam lever 127 is provided for moving the supporting members 105 and 106 together against the action of the spring 116 and the lever 127 is pivoted at 128 to one end of a rod 129. The rod 129 extends through apertures 130 and 131 in the supporting members 105 and 106 and has secured thereto, at its opposite end, a collar or nut 130 engaging the end of the member 106. The cam lever 127 is provided with a cam surface 133, which cooperates with cam surface 134 on the supporting member 105, and when moved to a vertical position, causes a relative movement between the rod 29 and the member 105 and serves to move the L-shaped supporting members 105 and 106 together. When the camming lever 127 is moved to the horizontal position, as shown in Fig. 2, the spring 116 acts to separate the supporting members 105 and 106 and the channel-shaped supporting members 98 and 99.

It will be apparent that when the cam lever 127 is in a vertical position, the supporting members 105 and 106 and the support members 98 and 99 are moved toward each other to provide ample clearance for the reception of the can side plates 19 and 20 between the supporting edges 100—100 and 101—101 thereof and the flanges 15 and 16 of the can member 10 and when the side plates 19 and 20 are positioned on the supporting edges 100 and 101 and the lever 127 moved to the horizontal position, the members 98 and 99 are moved apart by the spring 117 and act to hold the can side plates 19 and 20 firmly against the flanges 15 and 16 of the can member 10.

The fixture is adapted to support can assemblies of various sizes within a predetermined size range. To accommodate cans of different dimensions, the members 56, 57 and 98, 99 of the fixture are replaceable by other similar members of the proper size and, as previously mentioned, the brackets 43 and 44 are adjustable on the supporting member 25 and the clamps 75 and 76 are mounted for longitudinal adjustment along the rods 81 and 82.

In using the fixture to support parts of the can in assembled relation to solder the parts together, the supporting members 56, 57 and 98, 99 of the proper size are provided and the parts adjusted to the correct position to accommodate the can of the size to be assembled. With the parts of the fixture properly adjusted to receive the can parts to be assembled and with the can holding members 75 and 76 in the vertical position and the camming lever 127 in a vertical position so the supporting members 98 and 99 are in their contracted position, a can side 19 may be positioned on the edges 100 of the supporting member 98. The lower plate 20 may be placed on the flanges 16 of the U-shaped can member 10, and the can member 10, with the plate 20 in place thereon, may be moved in front of the plate 19 and the supporting members 98 and 99, with the open end of the can member 10 in alignment with the plate 19 and between the positioning flanges 58 and 59 and with the flanges 15 of the can part 10 positioned slightly above the plate 19. The can member 10 and the plate 20 carried thereby may then be moved forward with the side walls 11 and 12 fitting between the flanges 58 and 59 of the guide plates 56 and 57 and around the plate 19 and the supporting members 98, 99 and 103, 104 and with the flanges 15 thereof overlying the plate 19 and with the lower plate 20 positioned underneath the edges 101—101 of the channel supporting member 99. The U-shaped can member 10 may be advanced until the forward edges of the walls 11 and 12 thereof engage the inclined surfaces 63 and 64 of the stop members 61 and 62 and stop the forward movement of the member 10 in the position shown in the drawings. The cam lever 127 may then be moved to the horizontal position shown in Fig. 2, which releases the holding force on the members 105 and 106, and permits them and the can plate supporting members 98 and 99 to be moved apart by the spring 116 to move the can side plates 19 and 20 into engagement with the flanges 15 and 16, respectively, of the U-shaped can member 10.

After the positioning members 98 and 99 have been moved apart to bring the side plates 19 and 20 into engagement with the flanges 15 and 16 of the can part 10, the operator may engage the handles 94 and 95 and rotate the can holding members 75 and 76 to a horizontal position, by which movement the members 75 and 76 engage the can 10 and are cammed rearwardly and the U-shaped can member 10 is urged forwardly thereby and firmly held in position. With the can parts held in this position, as illustrated in the drawings, the can side plate 19 may be soldered to the flanges 15 of the can body 10, after which the fixture may be turned 180° by the engagement of the handle portion 26 and an application of a turning force thereto to present the can side 20 upwardly in a position where it may be soldered to the flanges 16 of the can body 10. On completion of the soldering operation on both sides of the can, the can holding members 75 and 76 may be rotated to a vertical position and the camming lever 127 may be rotated to a vertical position to move the members 105 and 106 and the can supporting members 98 and 99 together to release their grip on the can, which may then be removed from the fixture.

What is claimed is:

1. A soldering fixture for supporting the four walls of a composite rectangular can in assembled relation during the processing thereof wherein one pair of opposed walls of a can have inwardly directed flanges on the opposite side edges and the other pair of opposed walls of the can are disposed transversely between said one pair of walls and in engagement with the flanges thereof, said fixture comprising a rotatable supporting member, means for rotatably supporting said member, a pair of spaced positioning members mounted on said supporting member and having opposed surfaces for receiving and positioning said one pair of walls, stop members on said positioning members engageable with the ends of said one pair of walls, gripping members yieldably carried by said positioning members for holding said one pair of walls in position against said stop members, a pair of movable elements mounted on said supporting member between said positioning members and having oppositely disposed surfaces engageable with said other pair of walls for holding said other pair of walls against the flanges of said one pair of walls, and resilient means for moving said elements apart into operative position to hold said one pair of walls against the flanges on said other pair of walls, said supporting member being rotatable to present opposite sides of the can to a position accessible to the operator.

2. A soldering fixture for supporting the four walls of a composite rectangular can in assembled relation wherein one pair of opposed walls of the can are integral with an end wall to form a U-shaped can member having inwardly directed flanges on the opposite side edges thereof and the other pair of opposed walls of the can are disposed transversely between said one pair of walls and in engagement with the flanges therewith, said fixture comprising a rotatable supporting member, means for rotatably supporting said member, a pair of positioning members mounted on the supporting member and having opposed surfaces for receiving in engagement therewith, said one pair of walls of said flanged U-shaped can part, stop members carried by the positioning members having inclined surfaces thereon engageable with the forward edges of the U-shaped can member for camming the sides thereof against the positioning members and stopping the U-shaped can member in a predetermined position thereon, movable members yieldingly mounted on said stationary positioning members for holding said U-shaped can part in position against said stop members, a pair of movable brackets slidably mounted on said supporting member between said positioning members, adjustable positioning elements mounted on said movable brackets and having oppositely disposed surfaces thereon engageable with said other pair of walls, means for adjusting the adjustable positioning elements on the movable brackets to move the can engaging surfaces thereof into predetermined relative positions, and means for moving the movable brackets into an operative position to support said other pair of walls against the flanges of the U-shaped can part, said supporting member being rotatable to present opposite sides of the can to a position accessible to the operator.

3. A soldering fixture for supporting the four walls of a composite rectangular can in assembled relation wherein one pair of the opposed walls of the can are integral with an end wall to form a U-shaped can member having inwardly directed flanges on the opposite side edges thereof and the other pair of opposed walls of the can are disposed transversely between said one pair of walls and in engagement with the flanges thereof, said fixture comprising a rotary main supporting member, means for supporting said member, a pair of positioning members having opposed surfaces for receiving in engagement therewith said one pair of walls of said U-shaped can member, means for adjustably securing the positioning members to the main supporting member whereby said members may be adjusted to receive U-shaped can members of various sizes, stops on the positioning members engageable with the ends of said one pair of walls for stopping the U-shaped can member in a predetermined position thereon and having portions for holding the walls of said can member against the positioning members, clamping members carried by the positioning members for holding the U-shaped can member in position against said stops, said clamping members being adjustable on said positioning members to accommodate cans of various sizes, a pair of movable brackets slidably mounted on the main supporting member between said positioning members, positioning elements mounted on the brackets and having surfaces thereon for engaging said other pair of walls, means for adjusting said positioning elements on the brackets to align the wall engaging surfaces thereon relative to each other, resilient means for moving the brackets away from each other to move the other pair of walls into engagement with the flanges of the U-shaped can member, means for moving the brackets toward each other, said main supporting member being rotatable to present opposite sides of the can to a position accessible to the operator, and means for yieldingly retaining the main supporting member in each of said positions.

4. In a fixture for supporting four walls of a composite hollow article in assembled relation wherein a first pair of opposed walls of the article are disposed transversely between a second pair of opposed walls and in engagement therewith and with flanges extending inwardly from the opposite side edges thereof, said fixture comprising a supporting member, a pair of spaced positioning members mounted on said supporting member and having oppositely disposed surfaces adapted to engage and position said pair of flanged walls, a pair of movable positioning elements disposed between said positioning members and having oppositely disposed surfaces arranged transversely to said oppositely disposed surfaces of said positioning members and adapted to engage the first pair of opposed walls of said article, means mounting said positioning elements on said supporting member for movement substantially parallel to the oppositely disposed surfaces of said positioning members whereby said movable positioning elements may be moved to position said first pair of walls against the flanges of the other pair of walls of said article, and means to maintain said positioning elements in said wall holding position whereby the walls of said article are held in assembled relation on said supporting member.

5. A fixture for supporting the four walls of a composite rectangular can in assembled relation during the processing thereof wherein one pair of opposed walls of a can are formed integrally with an end member of the can and have inwardly directed flanges on the opposite side edges thereof and the other pair of opposed walls of the can are disposed transversely between said one pair of walls and in engagement with the flanges thereof, said fixture comprising a supporting member, a pair of spaced positioning members mounted on said supporting member and having opposed surfaces adapted to slidingly engage the exterior surfaces of the pair of flanged walls of said can to position said pair of flanged walls, a pair of movable positioning elements mounted on said supporting member between said positioning members and having oppositely disposed surfaces arranged transversely to said oppositely disposed surfaces of said positioning members and adapted to engage the interior surfaces of the other pair of opposed walls of the can, means guiding said positioning elements on said supporting member for movement substantially parallel to the oppositely disposed surfaces of said positioning members whereby said elements may be moved to position said walls against the flanges of said one pair of walls, resilient means to maintain said positioning elements in said wall holding position whereby the walls of said can are held in assembled relation on said supporting member, and means mounting said supporting member for movement to present opposite sides of the can to a position accessible to the operator.

6. A fixture for supporting the four walls of a composite rectangular can in assembled relation wherein one pair of opposed walls of the can have inwardly directed flanges on the opposite side edges thereof and the other pair of opposed walls of the can are disposed transversely between said one pair of walls and in engagement with the flanges thereof, said fixture comprising a rotatable main supporting member, means for rotatably supporting said member, a pair of spaced positioning members mounted on said supporting member and having opposed surfaces adapted to engage and position said one pair of walls, a pair of movable positioning elements mounted on said main supporting member between said positioning members and having oppositely disposed surfaces adapted to engage said other pair of walls, said positioning elements being movable on said supporting member in a direction substantially parallel to the oppositely disposed surfaces of said positioning members whereby said elements may be moved to support said other pair of walls in engagement with the flanges on said one pair of walls, and means for moving said movable elements to an operative position whereby the walls of said can are held in assembled relation.

7. A fixture for supporting a composite article comprising a pair of spaced positioning members having opposed positioning surfaces adapted to engage and position one pair of flanged walls of said article, a pair of positioning elements having positioning surfaces disposed transversely to the positioning surfaces of said positioning members and adapted to engage and position another pair of walls of said article against the flanges of said flanged walls, means for supporting said positioning members and said positioning elements and for guiding one of said positioning elements for movement toward and away from the other positioning element in a direction transversely to the plane of the positioning surfaces thereon, and means for moving said one positioning element to an operative position in which position the positioning elements and members are arranged to hold the two pairs of walls of an article applied to said fixture in assembled relation to each other.

8. A fixture for supporting a composite article comprising a pair of spaced positioning members having opposed positioning surfaces adapted to engage and position a pair of flanged walls of said article, a pair of positioning elements having positioning surfaces disposed transversely to the positioning surfaces of said positioning members and adapted to engage and position another pair of walls of said article against the flanges of said flanged walls, means for supporting said positioning members and said positioning elements and for guiding said positioning elements for movement toward and away from each other in a direction transversely to the plane of the positioning surfaces thereon, and means for moving said positioning elements to an operative position in which position the positioning elements and members are arranged to hold the two pairs of walls of an article applied to the fixture in assembled relation to each other.

9. A fixture for supporting a composite article comprising a support, a pair of spaced positioning members mounted on said support and having opposed positioning surfaces adapted to engage and position one pair of flanged walls of said article, a pair of positioning elements mounted on said support for movement toward and away from each other in a direction substantially parallel to the positioning surface of one of said positioning members, positioning surfaces on said positioning elements disposed transversely to the positioning surfaces of said positioning members and adapted to engage and position another pair of walls of said article against the flanges of said flanged walls, yieldable means for moving said positioning elements to an operative position, in which position the positioning elements and members are arranged to hold the two pairs of walls of an article applied to said fixture in assembled relation to each other, and means operable to move said positioning elements to an inoperative position where the article may be removed from the fixture.

10. A fixture for supporting a composite article comprising a support, a pair of spaced positioning members mounted on said support and having opposed positioning surfaces adapted to engage and position one pair of flanged walls of said article, means on said positioning members for holding said flanged walls thereon, a pair of positioning elements between said positioning members and having positioning surfaces disposed transversely to the positioning surfaces of said positioning members and adapted to engage and position another pair of walls of said article against the flanges of said flanged walls, means mounting said positioning elements for movement on said support toward and away from each other in a direction transverse to the positioning surfaces thereon, spring means for moving said positioning elements to an operative position to hold the two pairs of walls of an article applied to said fixture in assembled relation to each other, and means operable to move said positioning elements to an inoperative position to permit the article to be removed from the fixture.

11. A fixture for supporting a composite article comprising a support, a pair of spaced positioning members mounted on said support and having opposed positioning surfaces adapted to engage and position one pair of flanged walls of said article, stop members mounted on said positioning members engageable with one of the edges of said flanged walls, means resiliently mounted on said positioning members and engageable with other edges of said flanged walls of said article for holding said flanged walls on said positioning members, a pair of positioning elements mounted on said support for movement toward and away from each other in a direction substantially parallel to the positioning surface of one of said positioning members, positioning surfaces on said positioning elements disposed transversely to the positioning surfaces of said positioning members and adapted to engage and position another pair of walls on said article against the flanges of said flanged walls, yieldable means for moving said positioning elements to an operative position to hold the two pairs of walls of an article applied to said fixture in assembled relation to each other, and means operable to move said positioning elements to an inoperative position to permit the article to be removed from the fixture.

WALTER B. FAIRFIELD.

REFERENCES CITED

The following references are of record in the file of this patent:

UNITED STATES PATENTS

| Number | Name | Date |
|---|---|---|
| 247,992 | Jones | Oct. 4, 1881 |
| 1,642,548 | Jarecki | Sept. 13, 1927 |
| 1,642,549 | Jarecki | Sept. 13, 1927 |
| 2,095,964 | Blickman | Oct. 19, 1937 |
| 2,337,383 | Franz | Dec. 21, 1943 |
| 2,356,864 | Martin | Aug. 29, 1944 |
| 2,383,314 | Hubbard | Aug. 21, 1945 |
| 2,393,198 | Somerville | Jan. 15, 1946 |